United States Patent
Ernst et al.

(10) Patent No.: US 11,889,299 B2
(45) Date of Patent: Jan. 30, 2024

(54) METHOD FOR THE ANONYMIZED PROVISION OF DATA OF A FIRST VEHICLE FOR A VEHICLE-EXTERNAL SERVER DEVICE, AND ANONYMIZATION APPARATUS AND MOTOR VEHICLE

(71) Applicant: AUDI AG, Ingolstadt (DE)

(72) Inventors: Sebastian Ernst, Ingolstadt (DE); Andreas Buck, Puschendorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/265,391

(22) PCT Filed: Mar. 20, 2020

(86) PCT No.: PCT/EP2020/057724
§ 371 (c)(1),
(2) Date: Feb. 2, 2021

(87) PCT Pub. No.: WO2020/207755
PCT Pub. Date: Oct. 15, 2020

(65) Prior Publication Data
US 2022/0022032 A1  Jan. 20, 2022

(30) Foreign Application Priority Data
Apr. 9, 2019  (DE) .................... 10 2019 205 033.6

(51) Int. Cl.
*H04W 12/02* (2009.01)
*H04W 4/44* (2018.01)
(Continued)

(52) U.S. Cl.
CPC ............. *H04W 12/02* (2013.01); *H04L 9/30* (2013.01); *H04W 4/44* (2018.02); *H04W 12/009* (2019.01); *H04W 84/18* (2013.01)

(58) Field of Classification Search
CPC ..... H04W 12/02; H04W 4/44; H04W 12/009; H04W 84/18; H04W 4/40; H04W 4/48;
(Continued)

(56) References Cited

U.S. PATENT DOCUMENTS

| 10,524,187 B2 | 12/2019 | Onishi et al. |
| 10,846,428 B2 | 11/2020 | Max et al. |

(Continued)

FOREIGN PATENT DOCUMENTS

| CN | 102904896 A | 1/2013 |
| CN | 108391248 A | 8/2018 |

(Continued)

OTHER PUBLICATIONS

Wu, Di, Yuan Zhang, Lichun Bao, and Amelia C. Regan. "Location-based crowdsourcing for vehicular communication in hybrid networks." Jun. 2013, IEEE transactions on intelligent transportation systems 14, No. 2 (2013): 837-846. (Year: 2013).*

(Continued)

*Primary Examiner* — Harunur Rashid
(74) *Attorney, Agent, or Firm* — Sterne, Kessler, Goldstein & Fox P.L.L.C.

(57) ABSTRACT

In order to provide sensitive vehicle data of a first vehicle as anonymously as possible, the present disclosure relates to a method for the anonymized provision of the data of the first vehicle for a vehicle-external server device. According to a defined or definable condition, a decision is made between transmitting the data directly to the vehicle-external server device or transmitting the data to the vehicle-external server device via a second vehicle, which has a communication connection to the first vehicle. The data are then transmitted according to the decision. In n-hop anonymization, the data can be forwarded via an arbitrary number of vehicles as intermediaries or intermediate stations.

14 Claims, 2 Drawing Sheets

(51) Int. Cl.
*H04W 12/00* (2021.01)
*H04L 9/30* (2006.01)
*H04W 84/18* (2009.01)

(58) Field of Classification Search
CPC ........ H04W 84/00; H04W 88/04; H04L 9/30;
H04L 67/12; H04L 63/0421
See application file for complete search history.

(56) References Cited

U.S. PATENT DOCUMENTS

| | | | | |
|---|---|---|---|---|
| 2003/0130893 | A1* | 7/2003 | Farmer | G06Q 30/0266 705/14.63 |
| 2011/0059693 | A1* | 3/2011 | O'Sullivan | G08G 1/123 455/41.1 |
| 2011/0183601 | A1* | 7/2011 | Hannon | H04W 4/48 455/67.11 |
| 2015/0296019 | A1 | 10/2015 | Onishi et al. | |
| 2015/0304331 | A1* | 10/2015 | Nakagawa | H04W 12/02 726/28 |
| 2016/0277435 | A1* | 9/2016 | Salajegheh | H04W 12/12 |
| 2018/0027600 | A1* | 1/2018 | Lawlis | H04W 12/02 713/168 |
| 2018/0062959 | A1 | 3/2018 | Justin et al. | |
| 2018/0285767 | A1 | 10/2018 | Chew | |
| 2019/0239137 | A1* | 8/2019 | Zhuang | H04W 88/04 |
| 2019/0248325 | A1 | 8/2019 | Schmidt et al. | |
| 2020/0275245 | A1 | 8/2020 | Haubner | |

FOREIGN PATENT DOCUMENTS

| | | |
|---|---|---|
| CN | 109562802 A | 4/2019 |
| DE | 102014005589 A1 | 9/2014 |
| DE | 102017106579 A1 | 10/2017 |
| DE | 102016225287 A1 | 6/2018 |
| DE | 102017215710 A1 | 3/2019 |
| DE | 102017222905 A1 | 6/2019 |
| EP | 2983381 A1 | 2/2016 |
| WO | WO 2018/000084 A1 | 1/2018 |

OTHER PUBLICATIONS

Conti, Mauro, Jeroen Willemsen, and Bruno Crispo. "Providing source location privacy in wireless sensor networks: A survey." 2013, IEEE Communications Surveys & Tutorials 15, No. 3 (2013): 1238-1280. (Year: 2013).*

International Preliminary Report on Patentability directed to related International Patent Application No. PCT/EP2020/057724, completed Oct. 7, 2020, with attached English-language translation; 15 pages.

International Search Report and Written Opinion of the International Searching Authority directed to related International Patent Application No. PCT/EP2020/057724, dated Jun. 19, 2020, with attached English-language translation; 17 pages.

* cited by examiner

METHOD FOR THE ANONYMIZED PROVISION OF DATA OF A FIRST VEHICLE FOR A VEHICLE-EXTERNAL SERVER DEVICE, AND ANONYMIZATION APPARATUS AND MOTOR VEHICLE

TECHNICAL FIELD

The present disclosure relates to a method for the anonymized provision of data of a first vehicle for a vehicle-external server device. The present disclosure also relates to an anonymization apparatus for the anonymized provision of data of the first vehicle for the vehicle-external server device. Finally, the present disclosure also relates to a motor vehicle having the anonymization apparatus mentioned.

BACKGROUND

Various methods for transmitting data from a motor vehicle, i.e., for communication from a motor vehicle, are known from the prior art. In particular, private vehicle-to-vehicle communication plays a decisive role in this case.

For example, US 2018/0027600 A1 discloses a method for private vehicle-to-vehicle communication. For this purpose, a vehicle comprises a vehicle communication system having sensors for observing a target vehicle, as well as a control unit. The control unit generates a pseudo-anonymous identifier based on an identification feature and a feature of the target vehicle. In addition, the control unit transmits a first message with the pseudo-anonymous identifier, a random number, and a public key. In response to receiving a second message with the identification feature and the random number, the control unit transmits a third message embedded in the second message, which has been encrypted with a symmetric key.

Furthermore, a method for transmitting messages for reliable vehicle communication is known from WO 2018/000084 A1.

The disadvantage of the prior art is that although the data are transmitted in encrypted form, the sender of the data is always known.

BRIEF DESCRIPTION OF THE DRAWINGS/FIGURES

DETAILED DESCRIPTION

Figure 1:
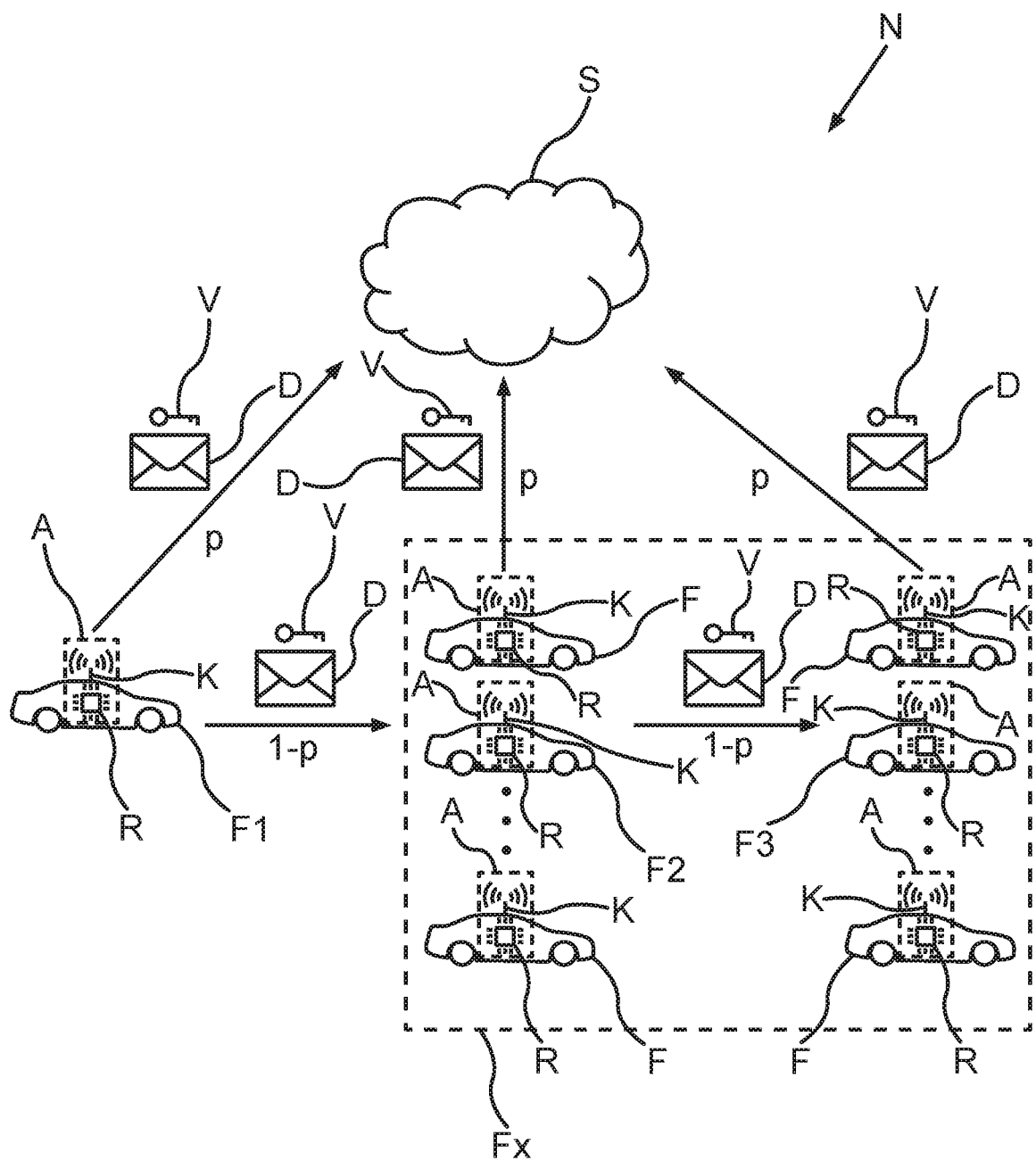
FIG. 1 is a schematic representation of an ad-hoc network having a plurality of vehicles and a vehicle-external server device for the anonymized provision of vehicle data to the vehicle-external server device, in accordance with some embodiments.

The object of the present disclosure is to provide anonymized data from a vehicle.

The object is achieved by the subject matter of the independent claims. Advantageous developments are disclosed by the dependent claims, the subsequent description, and the drawings in the present disclosure.

In some embodiments, a method for the anonymized provision of data from a vehicle for a vehicle-external server device is disclosed. In the method, according to a defined or definable condition, a decision is first made between transmitting the data directly to the vehicle-external server device or transmitting the data to the vehicle-external server device via a second vehicle, which has a communication connection to the first vehicle. The data are then transmitted according to the decision.

By way of a non-limiting example, the data are transmitted or provided to the vehicle-external server device either directly or indirectly depending on the defined or definable condition. The second vehicle can thus be viewed as an intermediate station for transmitting the data, which in particular represent vehicle data.

As described herein, for many applications an assignment of sender information, i.e., an authentication of the vehicle to the data, i.e., the vehicle data, also called user data, should be prevented when storing the data in a vehicle-external server device. In particular, in the case of personal data, such as a current position or GPS information, a speed or a rotational speed, a concatenation of the sender information with the data should be avoided. This makes it possible to prevent a driver of the vehicle from being prosecuted, for example, due to an increased speed, when checking the data that are stored in the vehicle-external server device.

A spatial separation of the data from the sender information is usually not sufficient. Spatial separation means that the data and the sender information are stored in different storage units of the vehicle-external server device. The principle of spatial separation allows the data to be linked with the registration information, such as a chassis number, for example, via an IP address that is stored with the other information and data, or other properties relating to the transport of data or other information, such as a time stamp.

At the same time, however, the data should be usable for other road users, such as other vehicles. For example, a position of the vehicle can be communicated to another vehicle in connection with a pothole detection. The pothole position can thus be reported to the other vehicle and a chassis of the other vehicle can be suitably set, for example, in order to avoid damage to the vehicle and possibly to improve the suspension of the vehicle. Therefore, alternative methods for anonymizing the data, such as noise in the data, cannot be used in this case. Accordingly, corruption, such as noise, of the useful data should be avoided since the useful data, for example, the actual pothole position, no longer matches the pothole position transmitted to the further vehicle. As a result of the falsification, the useful data can become less useful or unusable for many applications.

In some embodiments, the present disclosure provides a method by means of which an association of the sender information with the data can be prevented. The method is based on the principle of anonymizing the sender, i.e., the first vehicle, by possibly submitting the data via one or, if necessary, a plurality of intermediaries, i.e., the second vehicle. A message to be transmitted, i.e., the data, can possibly not be transmitted directly to the server device, but instead can also be transmitted first to the second vehicle, depending on the condition. When the data are finally transmitted to the vehicle-external server device, the vehicle-external server device can store the data and provide it for retrieval or transmission to other road users, such as other vehicles.

Accordingly, the vehicle-external server device cannot say with certainty who the original sender of the data is, i.e., which vehicle originally provided the data. The anonymization can thus take place according to the principle of plausible deniability. Accordingly, the possibility of a detour for the data, for example via the second vehicle, is a sufficient anonymization criterion from the point of view of the vehicle-external server device. Malicious intermediaries could read the content of the message in plain text, but could not infer the origin of the data.

In some embodiments, the vehicle-external server device can, for example, be designed as a central backend, which can in particular be provided by a manufacturer of the vehicle. If the condition is defined, the condition can be stored, for example, in a storage device of the first vehicle. If, on the other hand, the condition is definable, the condition can also be communicated to the first vehicle by the vehicle-external server device, for example. By way of a non-limiting example, the condition of the first vehicle can also be defined at random each time when submitting data, for example with the aid of a random generator.

In some embodiments, the first vehicle, the vehicle-external server device represent participants in an ad-hoc network to a large number of other vehicles, the second vehicle being selected at random from the plurality of other vehicles for transmitting the data.

In this context, in some embodiments, "random" can be understood as that the second vehicle is determined with the aid of a random algorithm or a random generator. Thus, within the scope of the possibilities of the random algorithm, the second vehicle can thus be selected at random from the other vehicles as a participant in the ad-hoc network.

The method described herein in accordance with some embodiments for the anonymized provision of the data can then also be carried out by the second vehicle. The second vehicle can therefore also make a decision, according to a defined or definable condition, between transmitting the data directly to the vehicle-external server device or transmitting to the vehicle-external server device via a further vehicle, which has a communication connection to the second vehicle. The second vehicle can then transmit the data according to the decision.

In some embodiments, any transfer of data from one vehicle to another can be designated a hop. Transmitting the data from the first to the second vehicle for forwarding to the vehicle-external server device can thus represent a first hop, i.e., a first transmission, for anonymizing the data. A decision is made according to the defined or definable condition that the data are transmitted from the second vehicle via a further vehicle as an intermediary or an intermediate station or relay station to the vehicle-external server device; this can be understood as a second hop of the data. Analogously, each additional vehicle from the plurality of additional vehicles in the ad-hoc network can also be designed to carry out the method for the anonymized provision of the data to the vehicle-external server device. Depending on the defined or definable condition, the data can thus be forwarded via n intermediate stations, i.e., n vehicles, to the vehicle-external server device. This allows the so-called n-hop anonymization of the data to be implemented.

Accordingly, the original sender of the message, i.e., the first vehicle, can be anonymized by transmitting the data via one or more intermediaries. In particular, the next vehicle in the transmission chain hides the vehicle that transmitted the message previously. The recipient of the data, i.e., either the next vehicle in the transmission chain or the vehicle-external server device, does not know its function in the transmission chain and therefore has no assurance about the originator, i.e., the original sender of the data. The anonymization can also be increased by extending the transmission chain.

In some embodiments, the ad-hoc network can be understood as a wireless network topology between two or more terminal devices, i.e., participants, without a fixed infrastructure. The communication connection between the participants can be established permanently with all participants, in particular during the driving operation, or, for example, only when required for transmitting the data. The size of the ad-hoc network, i.e., the number of participants, can in particular be defined deterministically. By way of a non-limiting example, a distance between the vehicles as participants in the ad-hoc network and/or national borders and/or communication costs can also be taken into consideration when forming the ad-hoc network. The vehicle-external server device can also represent a participant in more than one ad-hoc network.

In some embodiments, the ad-hoc network is adapted as a function of an operating state of the vehicles as participants. By way of a non-limiting example, a size of the ad-hoc network, i.e., a number of participating vehicles in the ad-hoc network, can be changed, taking into consideration the operating state of the respective vehicles. For example, only vehicles can be registered as participants in the ad-hoc network which are in an operating state of driving operation or stationary operation. An ignition of the vehicle can particularly preferably be activated. In contrast to this, a vehicle which is in a switched-off operating state can be logged off from the ad-hoc network, i.e., not represent a participant in the ad-hoc network.

In some embodiments, the ad-hoc network can be designed as an autonomous ad-hoc network which is set up and configured independently.

In some embodiments, when data are transmitted multiple times, the data are transmitted at most once via each of the plurality of vehicles to the vehicle-external server device.

By way of a non-limiting example, this can relate to the repeated transmitting of data during a first trip, i.e., from a first switched-off operating state to a switched-on operating state, for example, a driving operation, to a second switched-off operating state. Thus, the data from the first vehicle can in particular only be transmitted once directly to a specific second vehicle in the ad-hoc network. The data can then only be transmitted from the first vehicle indirectly via another vehicle to the specific second vehicle.

Accordingly, a transmission chain, i.e., a sequence of vehicles in the transmission chain, is constantly changing. This can make it more difficult to trace the data back to the original sender, so that the assignment of the sender to the data is further prevented.

In some embodiments, before the decision is made, the first vehicle is registered with an administration server device when starting a trip. The first vehicle then detects a list with communication information on the other participants in the ad-hoc network from the administration server device. Transmitting of the data takes place subsequently depending on the communication information.

This means that the first vehicle, and in particular also each of the other of the plurality of participating vehicles in the ad-hoc network, provides its respective registration data to the administration server device when the trip starts, i.e., in the switched-on operating state. The registration data can include a vehicle identification and/or an IP address and/or a chassis number, and/or encryption information of the respective vehicle. The administration server device can detect and store the registration data. The administration server device can then generate the list with the communication information on the other participating vehicles and the vehicle-external server device for each of the participating vehicles in the ad-hoc network, taking into consideration the registration data. The administration server device can then provide the respective list to the corresponding vehicle. The list can be updated periodically depending on a number of participants in the ad-hoc network. The vehicle-external server device described above can also represent the administration server device.

In some embodiments, the condition causes the data to be transmitted directly to the vehicle-external server device if the data were previously transmitted via a specified number of other vehicles in the ad-hoc network.

By way of a non-limiting example, the defined or definable condition can mean that a length of the transmission chain, i.e., a number of vehicles via which the data is transmitted from the first vehicle to the vehicle-external server device, is defined deterministically. For example, a count value and a limit value can also be transmitted to the respective next vehicle together with the data. The count value can, for example, describe a current number of hops, i.e., of transmissions from one vehicle to the next. The limit value, however, can determine a maximum number of hops for transmitting the data. The count value can thus be incremented by one with each hop, i.e., with each further transmission of the data to another vehicle. The data can then be transferred from vehicle to vehicle until the count value reaches the limit value. The data can therefore only be transmitted to the vehicle-external server device if the number of vehicles via which the data was transmitted to the vehicle-external server device reaches the limit value.

In some embodiments, the condition causes the data to be transmitted directly to the vehicle-external server device with a probability, and the data are transmitted with a counter-probability related to the probability via the second vehicle to the vehicle-external server device.

By way of a non-limiting example, the data may not be transmitted directly to the vehicle-external server device, but rather first be transmitted to the second vehicle, which can cover the original sender, with the opposite probability. The probability can preferably be defined individually for the first vehicle, in particular for each first vehicle, i.e., for each participant in the ad-hoc network. By way of a non-limiting example, the probability can also be specified jointly for each first vehicle. Furthermore, the probability can also be newly determined for each individual transmission process, that is, for each transmission of data.

In some embodiments, if the data are transmitted via the second vehicle to the vehicle-external server device, sender information of the first vehicle is deleted from the data.

Accordingly, the second vehicle can be identified as the sender of the data. The original sender of the data, the first vehicle in the transmission chain, can thus be covered. As a result, when storing the data in the vehicle-external server device, the data can be stored jointly with the sender information, but the original sender of the data may not be known. From the point of view of the vehicle-external server device, the data can originally originate from the first vehicle, but they could just as well have been originally provided by the second vehicle, or in particular one of the further vehicles in the ad-hoc network. This has the advantage of plausible deniability because the vehicle-external server device cannot say with certainty who originally transmitted the data.

In some embodiments, the data for authenticating the sender can particularly preferably be transmitted together with an authentication feature. The recipient of the data, i.e., the second vehicle or the vehicle-external server device, can thus ensure that the sender is authenticated. For this purpose, the authentication feature can be transmitted, for example, together with the registration information when registering on the administration server device. The list with the communication information can then also include the authentication features of the other participants in the ad-hoc network. Thus, for example, when receiving the data, the second vehicle can first compare the authentication feature of the first vehicle that was also transmitted with the authentication features in the list. If the authentication feature matches one of the authentication features in the list can the data then be forwarded from the second vehicle to a further intermediate station or the vehicle-external server device.

In some embodiments, the data are transmitted in an encrypted manner by means of asymmetric cryptography, in particular by means of an encryption method based on elliptic curves or a public key encryption method.

Accordingly, the data can thus be transmitted in a reversibly encrypted manner. This has the advantage that the data, without being falsified, cannot be read out by a third party who, in particular, is not a participant in the ad-hoc network or for whom the data is not originally intended. Therefore, reading of the data by a third party is prevented.

With such an encryption, the data can thus be reversibly encrypted and decrypted without the data being falsified, for example, by noise. The encryption information, such as public and private key pairs, can be stored together with a corresponding certificate for encryption when the anonymization function is installed in the vehicle. This means that the participants in the anonymization method can authenticate each other and the data can thus be transmitted securely.

The present disclosure also relates to an anonymization apparatus for the anonymized provision of data from a first vehicle for a vehicle-external server device. To this end, the anonymization apparatus includes a computing device for making a decision, according to a defined or definable condition, between transmitting the data directly to the vehicle-external server device or transmitting the data to the vehicle-external server device via at least one further vehicle, which has a communication connection to the first vehicle. Furthermore, the anonymization apparatus comprises a communication device for transmitting the data according to the decision.

The present disclosure also relates to a motor vehicle having the aforementioned anonymization apparatus.

Finally, the present disclosure also relates to a system made up of a plurality of motor vehicles having the aforementioned anonymization apparatus and a vehicle-external server device.

The present disclosure also includes refinements of the anonymization apparatus according to the invention and of the motor vehicle according to various embodiments described herein, and the system, which have features as were previously described in conjunction with the refinements of the method according to various embodiments described herein. For this reason, the corresponding refinements of the anonymization apparatus according to various embodiments described herein, of the motor vehicle, and the system are not described again herein.

The motor vehicle according to various embodiments as described herein is preferably designed as a car, in particular as a passenger car or truck or as passenger bus or motorcycle.

The present disclosure also comprises the combinations of the features of the described embodiments.

Embodiments of the present disclosure are described below by way of example.

The embodiments explained in the following by way of example are preferred embodiments. In the embodiments, the described components of the embodiments each represent individual features which are to be considered to be independent of one another and also include other combinations of the features of the embodiments than the ones presented. Furthermore, the described embodiments may also be supplemented by further features of as already described.

In the drawings, the same reference signs refer to functionally identical elements.

FIG. 1 is a schematic representation of an ad-hoc network having a plurality of vehicles and a vehicle-external server device for the anonymized provision of vehicle data to the vehicle-external server device, in accordance with some embodiments. FIG. 1 shows an ad-hoc network N comprising a vehicle-external server device S, a first vehicle F1, and a plurality of further vehicles Fx. The vehicle-external server device S, also called the central backend, is designed to store data D, in particular vehicle data, of the first vehicle F1. The data D of the first vehicle F1 can then be transmitted from the vehicle-external server device S to other vehicles or can be retrieved from other vehicles in order to allow the vehicle data to be exchanged between vehicles. The data D can be, for example, route data, such as a current position in connection with a pothole and/or in connection with a free parking space. Since position data, i.e. a current location of the first vehicle F1, generally represent personal data of an occupant of the first vehicle F1, it is advantageous to anonymize the data D that are provided by the first vehicle F1. This prevents the original sender of the data D, i.e., the vehicle F1, from being assigned to the stored data D when storing the data D in the vehicle-external server device S.

In order to implement the anonymized provision of the data D of the first vehicle F1 for the vehicle-external server device S, the data D according to a defined or definable condition can be transmitted directly in the ad-hoc network N from the vehicle F1 to the vehicle-external server device S or can be transmitted to the vehicle-external server device S via at least one second vehicle F2 from a plurality of vehicles Fx, which second vehicle has a communication connection to the first vehicle F1. For this purpose, the first vehicle F1 and each of the vehicles of the plurality of further vehicles Fx have an anonymization apparatus A having a computing device R and a communication device K. By means of the computing device R, according to the defined or definable condition, the decision can be made between the direct transmission of the data D from the first vehicle F1 to the vehicle-external server device S and the indirect transmission of the data D via at least one of the plurality of further vehicles Fx to the vehicle-external server device S. The communication device K can be designed accordingly to establish a communication connection between the transmitter, i.e. the first vehicle F1, and the respective recipient, i.e. the vehicle-external server device S, or a second vehicle F2 from the plurality Fx of other vehicles, and to transmit the data D according to the decision.

As a result of the direct or indirect transmission of the data D to the vehicle-external server device S, the vehicle-external server device S cannot say with certainty who the original sender of the data D was. The anonymization can thus take place according to the principle of plausible deniability.

In order to increase anonymization even further, a transmission chain can also be extended according to the defined or definable condition. For this purpose, each of the vehicles of the ad-hoc network N can transmit the data D of the first vehicle F1 during indirect transmission according to the defined or definable condition either to the vehicle-external server device S or to another vehicle from the plurality Fx of other vehicles. For example, it can be provided that the first vehicle F1 transmits the data D to the second vehicle F2 according to the defined or definable condition. The second vehicle F2, in particular the computing device R of the second vehicle F2, can then again make the decision between the direct transmission and the indirect transmission of the data to the vehicle-external server device S according to the defined or definable condition. If the computing device R of the second vehicle F2 makes the decision that the data D should be transmitted indirectly, the data D of the first vehicle F1 can then be transmitted to a third vehicle F3 from the plurality Fx of other vehicles. Analogously to the second vehicle F2, the third vehicle F3, in particular the computing device R of the third vehicle F3, can again make a decision between transmitting the data D directly or indirectly to the vehicle-external server device S according to the defined or definable condition. The forwarding of the data D via another vehicle can take place in particular until the data D is finally transmitted from a vehicle in the transmission chain to the vehicle-external server device S according to the defined or definable condition. Each operation of transmitting the data D via a further vehicle in the ad-hoc network N can also be designated a hop. The entire method can therefore also be designated n-hop anonymization, i.e., the forwarding of the data D via any number n of vehicles.

Depending on the desired degree of anonymization, n additional vehicles can be used as intermediaries to transfer the data. This increases the degree of anonymization if it is assumed that individual intermediaries or intermediate stations could maliciously intercept the data D. A length of the transmission chain can in particular be defined deterministically, i.e., with a fixed number of forwarding operations. Correspondingly, the defined or definable condition can represent a limit value for a specified number of vehicles via which the data D are to be forwarded to the vehicle-external server device S. By way of a non-limiting example, the defined or definable condition can also represent that the data D are transmitted directly to the vehicle-external server device S with a probability p, or that the data D are transmitted at least via the second vehicle F2 to the vehicle-external server device S with a counter-probability 1-p related to the probability. The probability of forwarding the data D can thus be defined with the parameter p.

Sender information of the original sender of the data D can preferably be deleted from the data D when the data D is transmitted indirectly. In particular, identification features of the first vehicle F1, such as a chassis number, an IP address, a license plate, or the like, can be understood as sender information. The respective recipient vehicle thus presents itself as the new sender of the data D. For the vehicle-external server device S, the sender appears to be that vehicle which was the last in the transmission chain to receive the data D and which finally transmits the data D directly to the vehicle-external server device S.

The respective recipient vehicle, such as, for example, the second vehicle F2 or the third vehicle F3, can preferably be selected at random from additional vehicles F of the plurality Fx of additional vehicles in the ad-hoc network N. For this purpose, a random algorithm can be stored in the respective computing device R, for example. When a message, i.e., the data D, is transmitted from the first vehicle F1, a random vehicle can thus be selected from the plurality Fx of other vehicles and used as an intermediate station, so to speak. The recipient vehicle, i.e., the vehicle selected at random, can then identify itself as the transmitter of the original data and can either transmit them again either directly to the vehicle-external server device S or forward the data to another vehicle as an intermediate station.

Communication between the participants in the ad-hoc network N can particularly preferably take place in that each of the participating vehicles receives a list of contact information on the other participants in the ad-hoc network N from an administration server device (not shown in FIG. 1). When starting to drive, the vehicles can register as participants in the ad-hoc network, for example, with the administration server device and can, in particular, provide a chassis number and/or an IP address, and/or encryption information to the administration server device. The administration server device can register the active participants, i.e., those participants in the ad-hoc network N who have transmitted their registration information, and generate a list of available vehicles and/or distribute them to the vehicles. When the operating state is switched off, the vehicles can be logged off again as participants in the ad-hoc network N. It can thus be ensured that the participants in the ad-hoc network N know each other. The list can preferably also include only a subset of the currently active, i.e. registered, vehicles in the ad-hoc network N.

The data D can preferably also be transmitted in an encrypted manner by means of an encryption V. Thus, not only authentication, but also encryption of the communication between the vehicles of the ad-hoc network N and the vehicle-external server device S can take place. In order to protect a communication path, i.e., a transmission of the data D, between the vehicles, the vehicles in the ad-hoc network N should therefore know and trust each other. To this end, it may be advisable to implement a mechanism that ensures the authenticity of the sender and allows mutual authentication. For example, the data can be transmitted in an encrypted manner by means of asymmetric cryptography, in particular by means of an elliptic curve encryption method or a public key encryption method. For example, so-called public and private key pairs can be stored in the vehicles when the anonymization function is installed, together with certificates, which can then be used for the authentication of the vehicles in the ad-hoc network N with one another.

Figure 2:
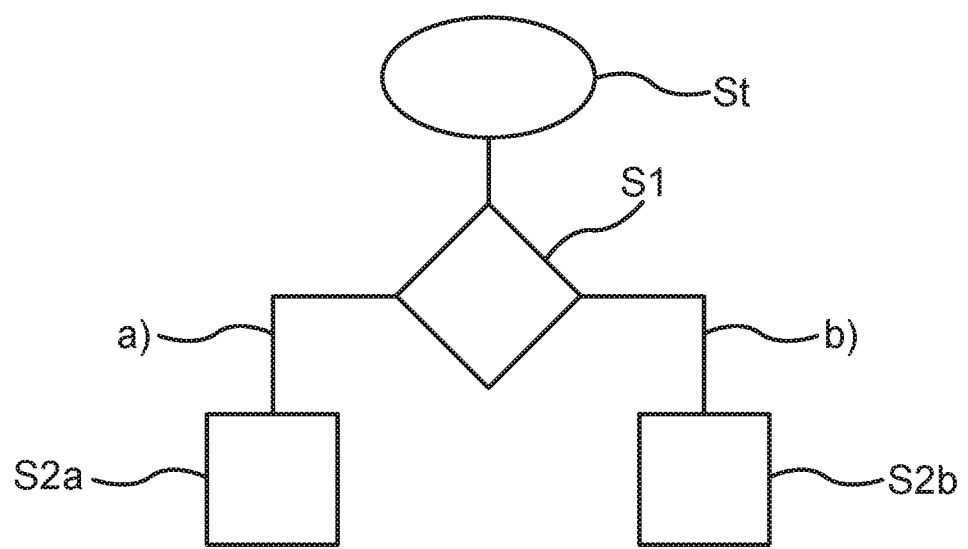
FIG. 2 is a schematic representation of individual method steps for the anonymized provision of data from a first vehicle for a vehicle-external server device, in accordance with some embodiments.

FIG. 2 is a schematic representation of individual method steps for the anonymized provision of data from a first vehicle for a vehicle-external server device, in accordance with some embodiments. Individual method steps of a method for the anonymized provision of data D of a first vehicle F1 for a vehicle-external server device S are shown in FIG. 2. The method can be started with a start step ST. In a first step S1, according to a defined or definable condition, the decision can be made between a) transmitting the data D to the vehicle-external server device or b) transmitting the data D to the vehicle-external server device S via a second vehicle F2, which has a communication connection to the first vehicle F1. If a decision is made according to a), the data D can be transmitted directly to the vehicle-external server device S in a next step S2a. By way of a non-limiting example, the data D, in the event that a decision is made according to b), the data D can be transmitted indirectly via the second vehicle F2 to the vehicle-external server device S in a step S2b.

The embodiment shown in FIG. 1 and FIG. 2 can be based on the following situation by way of an example. A road map with currently available parking spaces in the vicinity of a vehicle is to be provided to the vehicle by the vehicle-external server device S. For this purpose, every vehicle that is currently passing a currently free parking space or that is just pulling out of a parking space can provide a respective position, in particular a GPS (global positioning system) position, to the vehicle-external server device S. The position of the free parking spaces can thus be called up from the vehicle-external server device S by a vehicle which is currently searching for a free parking space. Position data are, however, to be regarded as sensitive and should therefore be anonymized. Using the previously described n-hop anonymization, an exact position of a currently free parking space, in particular via one or more intermediate stations, i.e., other vehicles as intermediaries, could now be transmitted to the vehicle-external server device S without revealing the identity of the original sender.

Overall, the present disclosure thus provides n-hop anonymization in ad-hoc car-to-car networks for anonymizing vehicle data.

The invention claimed is:

1. A method for a provision of data from a first vehicle to a vehicle-external server device, the method comprising:
    randomly selecting a recipient vehicle from one or more recipient vehicles;
    transmitting the data from a first vehicle to the vehicle-external server device by one or more successive hops facilitated by one or more recipient vehicles, wherein the one or more recipient vehicles are in an operating state, and wherein the operating state includes a driving operation or a stationary operation;
    transmitting to the recipient vehicle, a count value and a limit value wherein the count value describes a current number of hops and the limit value determines a maximum number of hops for transmitting the data;
    incrementing the count value by one with each successive hop;
    transmitting the data to the vehicle-external server device when the count value equals the limit value;
    transmitting an authentication feature of the first vehicle or a first recipient vehicle to a second recipient vehicle or to the vehicle-external server device;
    transmitting data to the second recipient vehicle or the vehicle-external server device, in response to verifying a match of the authentication feature with a listed authentication feature of a plurality of authentication features, by the second recipient vehicle or the vehicle-external server device; and
    deleting sender information of the first vehicle and the recipient vehicle from the data to anonymously transmit the data to the vehicle-external server device via a recipient vehicle.

2. The method of claim 1, wherein selecting the recipient vehicle from the one or more recipient vehicles comprises using a random algorithm or a random generator, and wherein the first vehicle, the one or more recipient vehicles, and the vehicle-external server device are participants in an ad-hoc network.

3. The method of claim 2, further comprising adapting the ad-hoc network in accordance with an operating state of the one or more recipient vehicles.

4. The method of claim 3, wherein the one or more recipient vehicles do not participate in the ad-hoc network when the one or more recipient vehicles are in a switched off operating state.

5. The method of claim 2, further comprising:
    transmitting the data to the vehicle-external server device over a plurality of hops, wherein a recipient vehicle of the one or more recipient vehicles is selected at most one time for a hop of the plurality of hops.

6. The method of claim 2, further comprising:
    registering the first vehicle with an administration server device when starting a trip; and receiving, from the administration server device, a list comprising communication information on the participants of the ad-hoc network.

7. The method of claim 2, further comprising transmitting the data to the vehicle-external server device upon determining that the data is transmitted via a predetermined number of vehicles of the one or more recipient vehicles in the ad-hoc network.

8. The method of claim 2, further comprising updating a list periodically depending on a number of the participants in the ad-hoc network.

9. The method of claim 1, further comprising transmitting the data in an encrypted manner using asymmetric cryptography, wherein the asymmetric cryptography is based on elliptic curves or a public key encryption method.

10. An anonymization apparatus for a transmission of data from a first vehicle to a vehicle-external server device, the anonymization apparatus comprising a processor and memory, the processor configured to:
- randomly select a recipient vehicle from one or more recipient vehicles;
- use the processor configured to transmit the data from a first vehicle to the vehicle-external server device by one or more successive hops facilitated by one or more recipient vehicles, wherein the one or more recipient vehicles are in an operating state, and wherein the operating state includes a driving operation or a stationary operation;
- transmit to the recipient vehicle, using a communication device, a count value and a limit value wherein the count value describes a current number of hops and the limit value determines a maximum number of hops for transmitting the data;
- increment the count value by one with each successive hop;
- transmit the data to the vehicle-external server device when the count value equals the limit value;
- transmit, using the communication device, an authentication feature of the first vehicle or a first recipient vehicle to a second recipient vehicle or to the vehicle-external server device;
- transmit, using the communication device, data to the second recipient vehicle or to the vehicle-external server device, in response to verifying a match of the authentication feature with a listed authentication feature of a plurality of authentication features, by the second recipient vehicle or the vehicle-external server device; and
- delete sender information of the first vehicle and the recipient vehicle from the data to anonymously transmit the data to the vehicle-external server device via the recipient vehicle.

11. The anonymization apparatus of claim 10, further configured to select the recipient vehicle from the one or more recipient vehicles using a random algorithm or a random generator, and wherein the first vehicle, the one or more recipient vehicles, and the vehicle-external server device are participants in an ad-hoc network.

12. The anonymization apparatus of claim 10, further configured to transmit the data to the vehicle-external server device upon determining that the data is transmitted via a predetermined number of recipient vehicles of the one or more recipient vehicles in the ad-hoc network.

13. The anonymization apparatus of claim 10, further configured to transmit the data in an encrypted manner using asymmetric cryptography, wherein the asymmetric cryptography is based on elliptic curves or a public key encryption method.

14. A motor vehicle comprising:
an anonymization apparatus for a transmission of data from a first vehicle to a vehicle-external server device, wherein the anonymization apparatus comprises a processor and memory, the processor being configured to:
- randomly select a recipient vehicle from one or more recipient vehicles, using the processor;
- use the processor to transmit the data from a first vehicle to the vehicle-external server device via one or more successive hops facilitated by one or more recipient vehicles, wherein the one or more recipient vehicles are in an operating state, and wherein the operating state includes a driving operation or a stationary operation;
- transmit to the recipient vehicle, using a communication device, a count value and a limit value wherein the count value describes a current number of hops and the limit value determines a maximum number of hops for transmitting the data;
- increment the count value by one with each successive hop;
- transmit the data to the vehicle-external server device when the count value equals the limit value;
- transmit, using the communication device, an authentication feature of the first vehicle or a first recipient vehicle to a second recipient vehicle or the vehicle-external server device;
- transmit, using the communication device, data to the second recipient vehicle or to the vehicle-external server device, in response to verifying a match of the authentication feature with a listed authentication feature of a plurality of authentication features, by the second recipient vehicle or the vehicle-external server device; and
- delete sender information of the first vehicle and the recipient vehicle from the data to anonymously transmit the data to the vehicle-external server device via the recipient vehicle.

* * * * *